United States Patent [19]

Ikegame

[11] Patent Number: 5,930,224
[45] Date of Patent: Jul. 27, 1999

[54] INFORMATION RECORDING/REPRODUCTION APPARATUS

[75] Inventor: Tetsuo Ikegame, Hachiojo, Japan

[73] Assignee: Olympus Optical Co., Ltd., Tokyo, Japan

[21] Appl. No.: 08/892,834

[22] Filed: Jul. 15, 1997

Related U.S. Application Data

[62] Division of application No. 08/633,429, Apr. 17, 1996, abandoned.

[30] Foreign Application Priority Data

Apr. 25, 1995 [JP] Japan .................................. 7-101095
Apr. 25, 1995 [JP] Japan .................................. 7-101096

[51] Int. Cl.$^6$ .............................. G11B 7/00; G11B 23/00
[52] U.S. Cl. ...................... 369/271; 369/112; 369/118; 369/270; 369/44.24
[58] Field of Search .................................. 369/283, 112, 369/118, 103, 94, 95, 44.21–44.25, 44.27, 44.11, 44.14, 264, 269, 270, 271

[56] References Cited

U.S. PATENT DOCUMENTS

| | | | |
|---|---|---|---|
| 3,999,009 | 12/1976 | Bouwhuis | 369/94 |
| 4,037,929 | 7/1977 | Bricot et al. | 359/40 |
| 4,124,273 | 11/1978 | Huignard et al. | 359/319 |
| 4,725,721 | 2/1988 | Nakamura et al. | 250/201.1 |
| 5,097,464 | 3/1992 | Nishiuchi et al. | 369/112 |
| 5,157,555 | 10/1992 | Reno | 359/823 |
| 5,202,875 | 4/1993 | Rosen et al. | 369/94 |
| 5,235,581 | 8/1993 | Miyagawa et al. | 369/44.12 |
| 5,408,453 | 4/1995 | Holtslag et al. | 369/44.23 |
| 5,416,757 | 5/1995 | Luecke et al. | 369/44.23 |
| 5,526,336 | 6/1996 | Park et al. | 369/94 |

FOREIGN PATENT DOCUMENTS

| | | |
|---|---|---|
| 62-281154 | 12/1987 | Japan . |
| 3-260934 | 11/1991 | Japan . |
| 4-121843 | 4/1992 | Japan . |

*Primary Examiner*—William J. Klimowicz
*Attorney, Agent, or Firm*—Frishauf, Holtz, Goodman, Langer & Chick

[57] ABSTRACT

An aberration correcting mechanism includes a corrective optical glass for correcting a spherical aberration and a link mechanism for movably supporting the corrective optical glass. The corrective optical glass is a parallel, flat plate having the same refractive index as that of a cover glass of a disk, and its length is slightly greater than the moving distance of an objective. The link mechanism has first and second links. While one end of each of the links is rotatably attached to its corresponding end portion of the corrective optical glass, the other ends of the links are rotatably mounted on the mounting portions on a deck base. The link mechanism also has a third link and a solenoid, and one end of the third link is rotatably attached to the central portion of the second link, while the other end of the third link is rotatably attached to the solenoid. The solenoid is fixed to a fixed portion on the deck base.

2 Claims, 7 Drawing Sheets

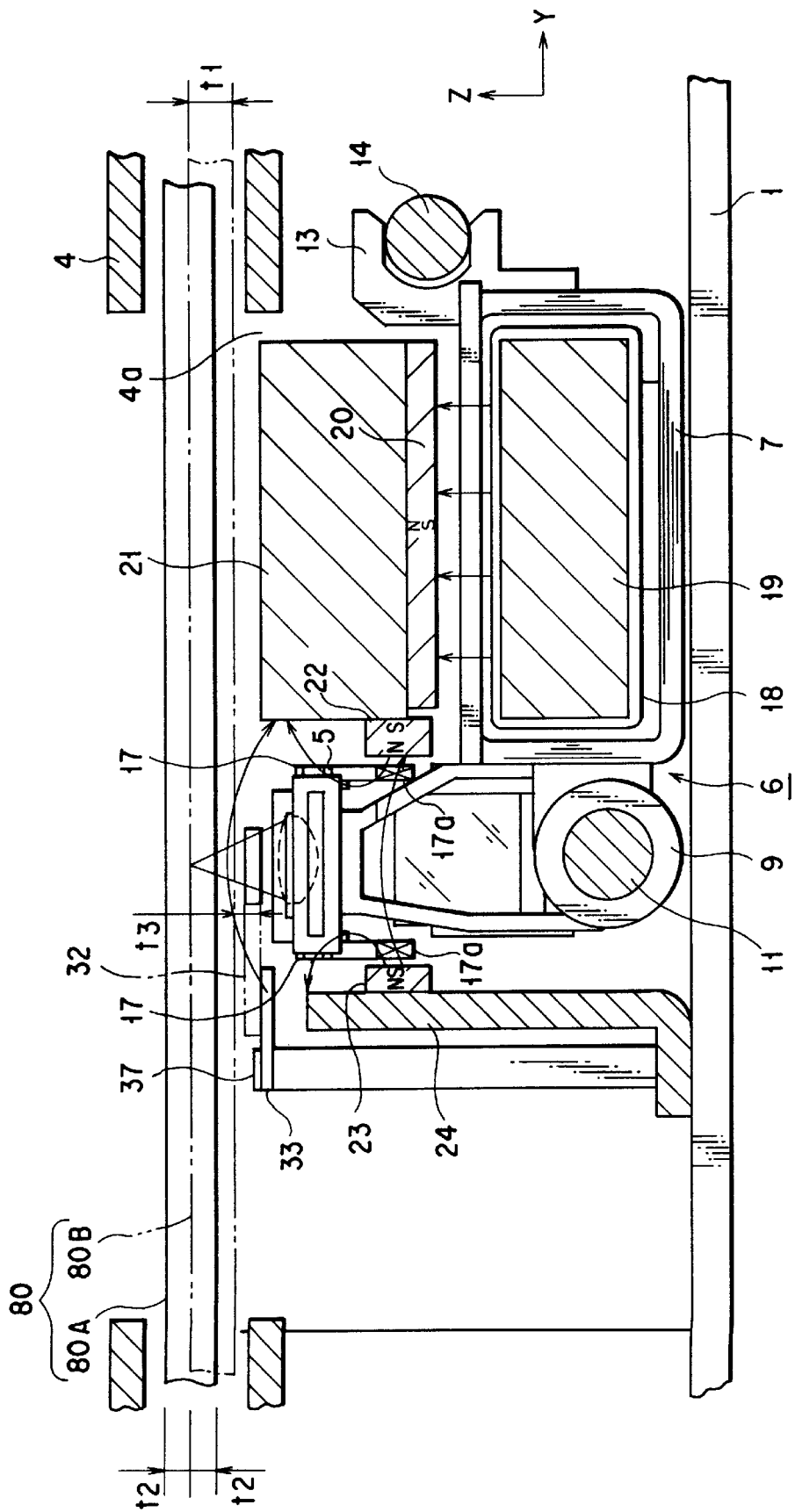
F I G. 2

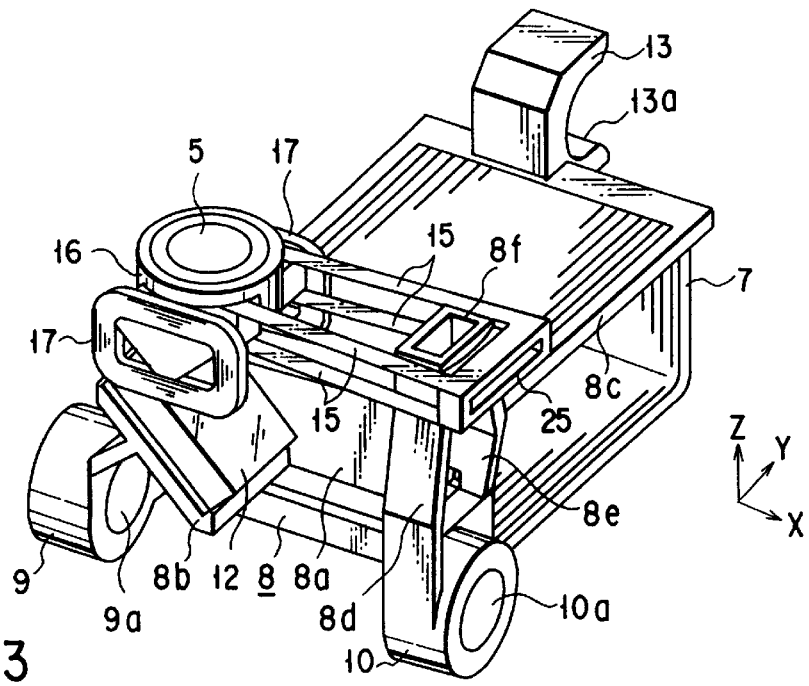
F I G. 3
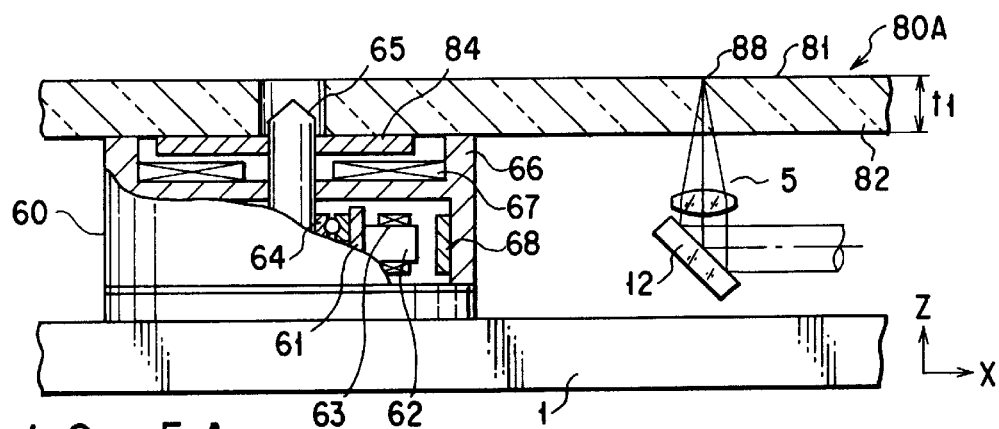
F I G. 5A
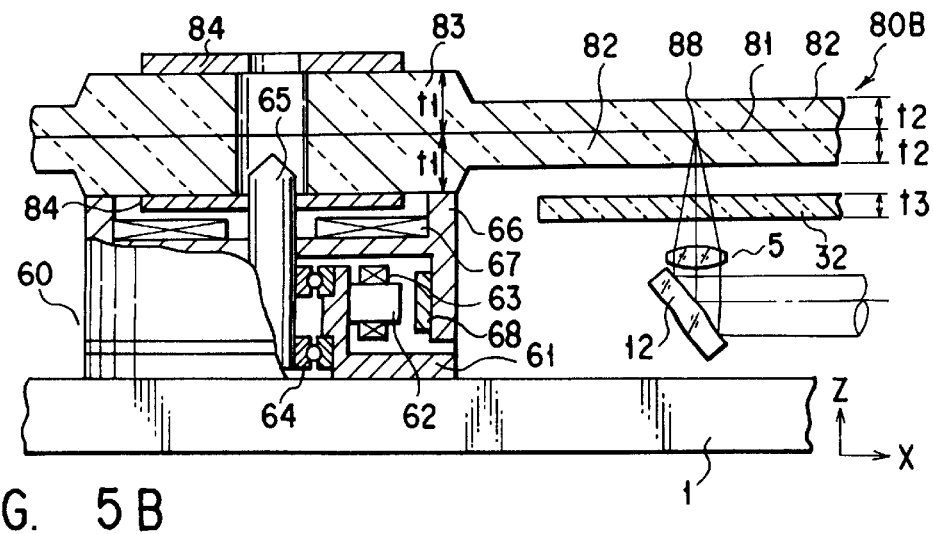
F I G. 5B

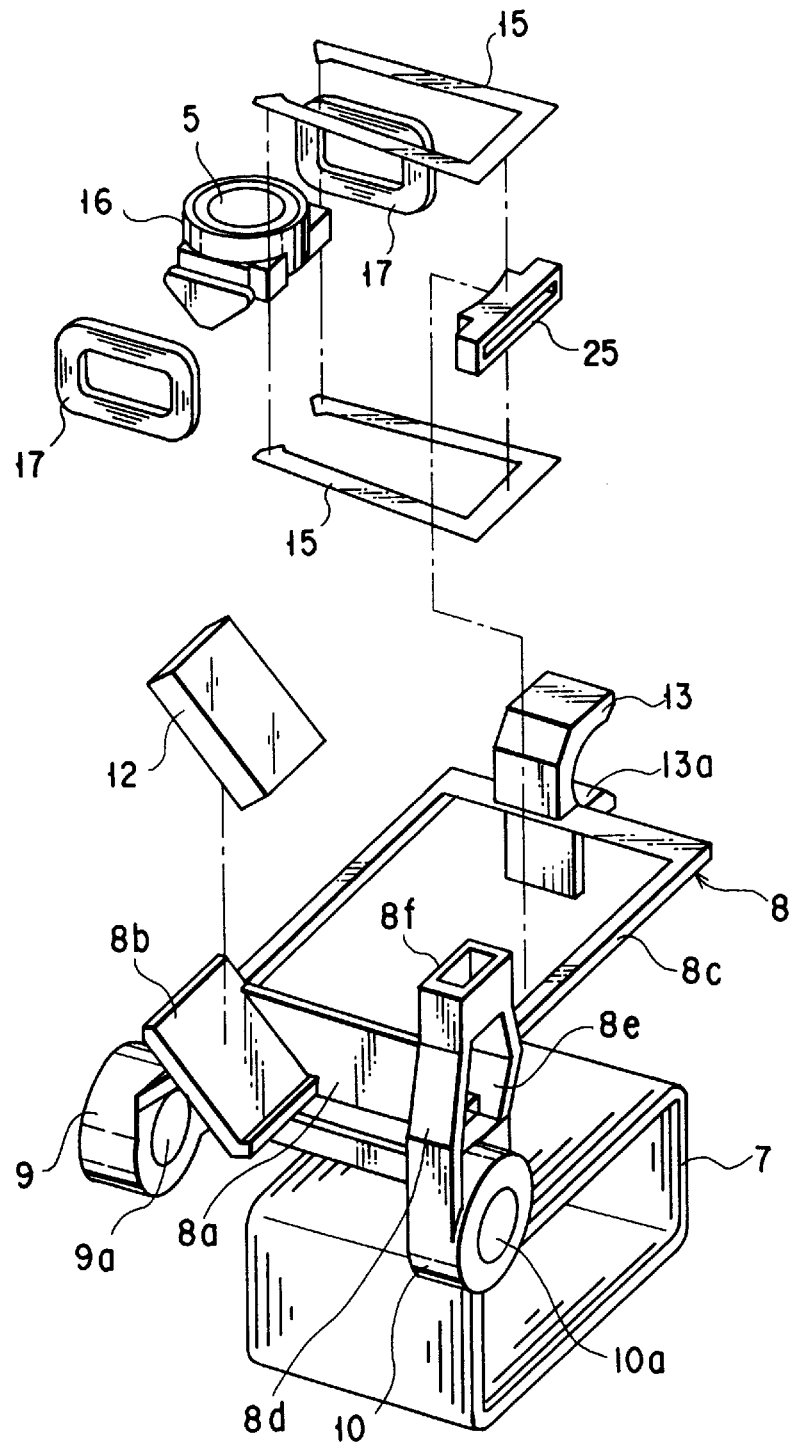
F I G. 4

INFORMATION RECORDING/REPRODUCTION APPARATUS

This application is a Division of application Ser. No. 08/633,429, filed Apr. 17, 1996, now abandoned.

Background of the Invention

1. Field of the Invention

The present invention relates to an information recording/reproduction apparatus for recording and/or reproducing information on/from an optical recording medium such as a compact disk, a photomagnetic disk and a phase change disk. Throughout the present specification, the wording "recording/reproduction" means the performing of recording or reproduction or both.

2. Description of the Related Art

Generally an information recording/reproduction apparatus includes a support driving mechanism for moving an objective along the optical axis, wherein the relative distance between the objective and optical recording medium is controlled such that a light spot formed by the objective can be located on the information recording face. In some information recording/reproduction apparatuses, an optical system is divided into a fixed section and a movable section in order to improve access and tracking. Naturally, a support driving mechanism is provided in the movable section. A support driving mechanism with a long stroke is large and heavy and thus decreases the driving sensitivity of the movable section. Therefore, a short-stroke, small-sized, and light support driving mechanism is favorable when it is loaded into the movable section. It is thus desirable that the information recording face of an optical recording medium be formed close to the focal point when the optical recording medium is loaded into the apparatus.

Recently, an information recording/reproduction apparatus for recording/reproducing information on/from a plurality of types of optical recording medium has been proposed. For example, these types of optical recording medium include a single-faced disk with only one information recording face and a double-faced disk with two information recording faces.

It is needless to say that in the above-described information recording/reproduction apparatus the optical recording mediums of different types vary in positional relationship between the information recording face and the focal point; accordingly, the reference position of the objective in focus control needs to be changed in accordance with the types of optical recording medium. To handle this problem, a long-stroke support driving mechanism is employed, which undesirably lowers the driving sensitivity of the movable section.

For a spindle motor for rotating a disk, it is desirable to fix the weight of the disk regardless of the type of disk. The simplest way of achieving the fixed weight is to vary the thickness of a protective layer (cover glass) covering an information recording face between single-faced and double-faced disks. The thickness of the protective layer of the single-faced disk is about twice as great as that of the protective layer of the double-faced disk.

An information recording/reproduction apparatus is designed by setting an ideal value for each of various parameters; accordingly, one ideal value is set for the thickness of a protective layer. For this reason, a spherical aberration is small enough so that it may be ignored with respect to an optical recording medium whose protective layer has a thickness close to the ideal value, whereas it is large enough so that it cannot be ignored with respect to an optical recording medium whose protective layer has a thickness far from the ideal value.

In order to record/reproduce information on/from optical recording mediums of different types the protective layers of which have different thicknesses by a single information recording/reproduction apparatus, it is necessary to take measures for correcting a spherical aberration caused by differences in thickness among the protective layers.

Jpn. Pat. Appln. KOKAI Publication No. 3-260934 discloses an information recording/reproduction apparatus which is applicable to a plurality of optical recording mediums of different types whose protective layers have different thicknesses. This apparatus comprises a movable section having an objective, wherein a corrective optical element is properly attached to the movable section according to the type of disk to correct a spherical aberration caused by difference in thickness among the protective layers.

However, both the weight and the center of gravity of the movable section vary depending upon whether the corrective optical element is attached or not. The variations in weight vary the driving sensitivity, and the variations in driving sensitivity vary the servo gain of a drive head. These variations are unfavorable for focus control. Moreover, the variations in the center of gravity make it impossible to maintain an ideal condition in which the driving force is always exerted on the center of gravity. As a result, a resonance occurs in the movable section thereby degrading servo characteristics.

Still further, the corrective optical element is attached or detached outside a disk, the moving distance of the movable section is greater than that in a commonly-used apparatus, and the size of the apparatus becomes larger since it requires a space for attaching/detaching the corrective optical element.

SUMMARY OF THE INVENTION

An object of the present invention is to provide an information recording/reproduction apparatus wherein the reference position of an objective is fixed, irrespective of the type of optical recording medium.

Another object of the present invention is to provide an information recording/reproduction apparatus including a means for correcting a spherical aberration caused by difference in thickness among protective layers without varying the driving sensitivity or the center of gravity of a movable section or without increasing the size of the apparatus.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 2 is a cross-sectional view taken along line II—II of FIG. 1;

FIG. 3 is a perspective view of a movable section of the apparatus shown in FIG. 1;

FIG. 4 is an exploded, perspective view of the movable section shown in FIG. 3;

FIGS. 5A and 5B are partly cross-sectional views of information recording/reproduction apparatuses loaded with their respective disks of two different types which are applicable to the apparatus shown in FIG. 1;

DETAILED DESCRIPTION OF THE PREFERRED EMBODIMENTS (First embodiment)

The first embodiment of the present invention will now be described with reference to FIGS. 1 to 5. This embodiment is directed to an information recording/reproduction apparatus using a photomagnetic disk as a recording medium, to which the present invention is applied.

Figure 1:
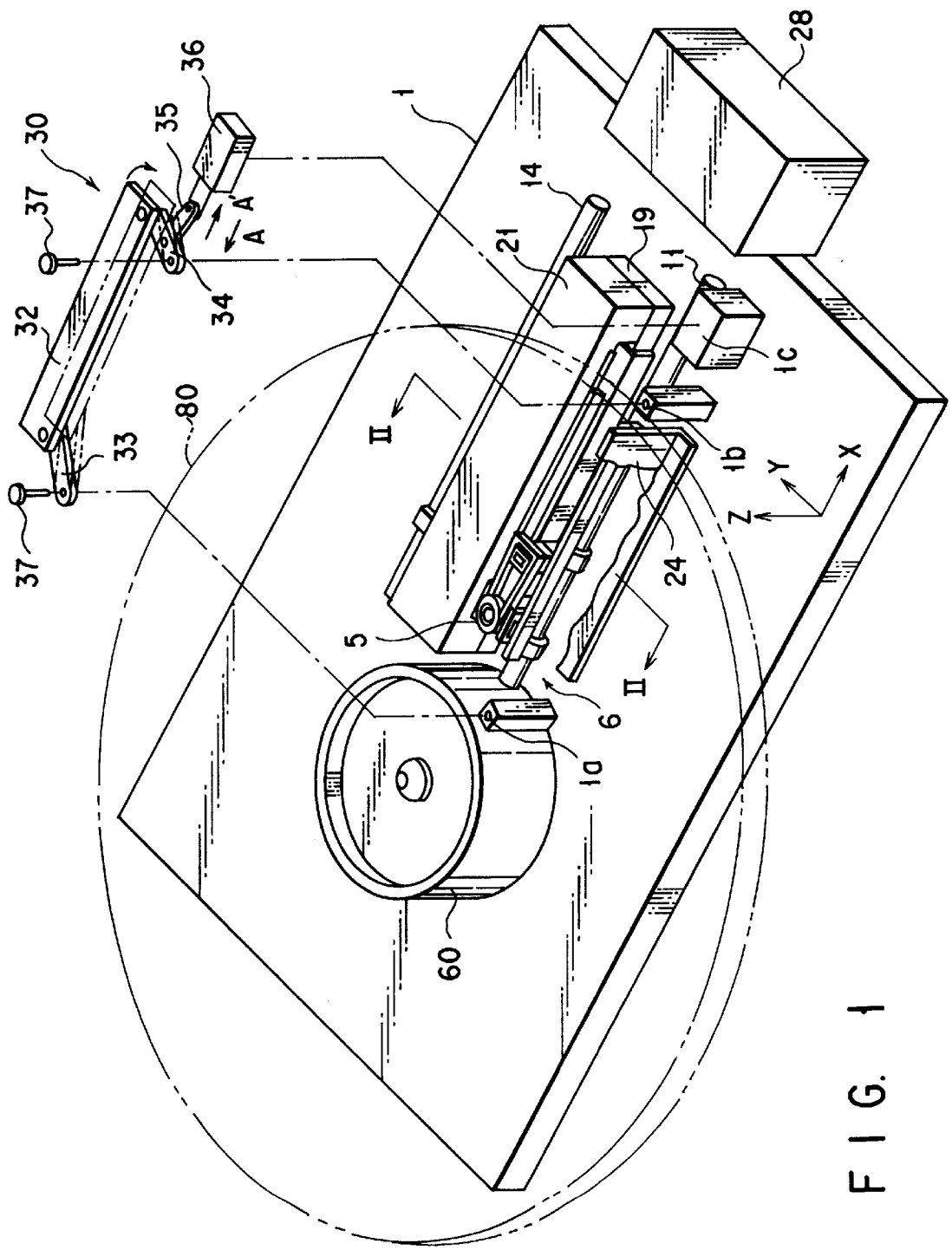
FIG. 1 is a perspective view of the entire information recording/reproduction apparatus according to a first embodiment of the present invention.

As illustrated in FIG. 1, a spindle motor 60 for rotating a disk 80 is fixed to a deck base 1. The disk 80 is, as shown in FIG. 2, located in a cartridge 4 having an opening 4a. Returning to FIG. 1, a movable section 6 with an objective 5 is supported by the deck base 1 such that it can be moved in the X direction.

A fixed optical system 28 is fixed on the +X side of the deck base 1 and includes a laser, a beam splitter and a photodetector.

An aberration correcting mechanism 30 is provided above the deck base 1. This mechanism includes a corrective optical glass 32 for correcting a spherical aberration caused by difference in thickness among protective layers (cover glasses) of disks. The spherical aberration is corrected by changing the position of the glass 32 in accordance with the type of disk loaded on the deck base 1.

As shown in FIGS. 3 and 4 the movable section 6 has an access coil 7 formed like a rectangular solid in its central part, and the access coil 7 serves mainly to maintain the entire rigidity of the movable section 6. A carriage 8 attached to the access coil 7 is formed of, e.g., epoxy resin containing spherical silica and includes a fixed section 8a adhered onto the −Y side of the access coil 7. The −Y side of the coil 7 is reinforced with the fixed section 8a.

Reference-side bearing sections 9 and 10 are formed on both ends of the fixed section 8a along the X direction. The bearing sections 9 and 10 has bearings 9a and 10a, respectively, and a guide rail 11 (shown in FIG. 1) is inserted into the bearings 9a and 10a and its ends are fixed onto the deck base 1. A fixed section 8b is interposed between the bearing sections 9 and 10, and a mirror 12 is fixed thereto. The mirror 12 reflects light emitted from the fixed optical system 28 and causes it to enter the objective 5.

A play-side bearing section 13 is provided on the +Y side of the access coil 7 and has a bearing 13a with an opened side (FIG. 3). A guide rail 14 (FIG. 1) is inserted in this bearing 13a. The guide rails 11 and 14 are made of stainless steel coated with ceramics of silicon carbide or fluoride. The bearing section 13 is adhered onto the +Y side of the access coil 7. The fixed section 8a and bearing section 13 are coupled to each other by a coupling member 8c and formed integrally with the carriage 8 as one component. The rigidity between the bearing sections 9 and 10 and the bearing section 13 are maintained mainly by the access coil 7. The carriage 8 may be insert-molded with the access coil 7.

A coupling member 8d is projected from the bearing section 10 toward the +Z side of the coil 7, and a fixed section 8f is formed at the end of the coupling member 8d. A +X side of the fixed section 8f is of a part of a sphere having the central point coincident with a nodal point of the objective 5, and a holding member 25 has a −X side made of a part of the sphere, which is engaged with the +X side of the section 8f. After an inclination with respect to two axes perpendicular to the Z axis of the objective 5 has been adjusted, the holding member 25 is adhered on the fixed section 8f.

A spring 15 hanging on the holding member 25 and holder 16 is shaped like "U" by cutting out a stainless thin plate. The holding member 25 and holder 16 are insert-molded by plastics.

The objective 5 is fixed in the center of the holder 16, and rectangular focus coils 17 are fixed on both sides of the holder 16 in its Y direction.

As illustrated in FIG. 2, a center yoke 19 is arranged in the space of the access coil 17, and a short ring 18 is fixed on the periphery of the access coil 17. Furthermore, a magnet 20 for forming a magnetic gap with the center yoke 19 is fixed on the inner side (−Z side) of a side yoke 21 and both ends of the side yoke 21 contact those of the center yoke 19, thereby constituting an accessing magnetic circuit.

A magnet 22 is fixed on the −Y side of the side yoke 21 and opposed to the lower side 17a of the focus coil 17 on the +Y side. On the other hand, a magnet 23 is fixed on a yoke 24 fixed to the deck base 1, and opposed to the lower side 17a of the focus coil 17 on the −Y side.

An operation of the apparatus according to the first embodiment will now be described.

Referring to FIG. 2, magnetic fields are applied to the upper and lower sides of the focus coils 17 in directions opposite to each other. When current flows through the coils 17, the magnetic force is generated on these sides in the same Z direction, the spring 15 for supporting the holder 16 is bent in the Z direction, and the lens 5 is driven in the Z direction (see FIG. 3).

A magnetic field is applied to the access coil 7 by the magnet 20. When current flows through the coil 7, the magnetic force is generated on the coil 7 in the X direction and the movable section 6 is driven in the X direction. The bearings 9a, 10a and 13a of the movable section 6 then slide on the guide rails 11 and 14 in the X direction.

Since, as shown in FIG. 2, the side yoke 21 is located within the opening 4a of the disk cartridge 4, it is made closer to the optical disk 80, and an electromagnetic driving device can be decreased in height.

As illustrated in FIG. 4, the carriage 8 includes the bearing sections 9, 10 and 13, the fixed section 8b for fixing the mirror 12, the fixed section 8a, and the coupling members 8c, 8d and 8e, and its structure is simple and functional. Since the rigidity between the bearing sections 9 and 10 and the other bearing section 13 is maintained mainly by the access coil 7, the coupling member 8c has only to have such measurements as to cause resin to flow when the bearing section 13 is shaped, and its mass can be made very small.

When the movable section 6 moves in the X direction, its warp in the X and Y directions, its twist around the Y axis, and the like cause a resonance; however, the entire movable section 6 has high rigidity, maintained by the access coil 7, and there are no problems therein. Moreover, since the access coil 7 is formed of metal such as copper and aluminum, its elasticity is higher than that of a plastic-made access coil and its resonance frequency can be increased.

In an electromagnetic driving device having a movable coil, the coil is essential to a movable section. The coil serves as the principal constituent for the movable section and keeps the entire rigidity thereof, so that a carriage of the other principal constituent can be minimized in size.

Subsequently, the aberration correcting mechanism 30, which is the main constituent of the present invention, will be described with reference to FIGS. 1, 2, 5A and 5B.

The mechanism 30 includes a corrective optical glass 32 for correcting a spherical aberration and a supporting mechanism (link mechanism) for movably supporting the glass 32. The glass 32 is a parallel, flat plate having a thickness $t_3$ and the same refractive index as that of a cover glass (protective layer) 82 of the disk 80, and its length in the X direction is somewhat greater than the distance by which the objective 5 moves in the X direction. The link mechanism supports the corrective optical glass 32 such that the glass 32 can be moved in parallel with the disk 80 and therefore the glass 32 is supported in parallel with the cover glass 82.

The link mechanism has links 33 and 34, and one end of each of the links is rotatably attached to its corresponding end portion of the corrective optical glass 32, while the other ends of the links are rotatably mounted on the respective mounting portions 1a and 1b on the deck base 1 by pins 37.

The link mechanism also has another link 35 and a solenoid 36 for moving the link 35. One end of the link 35 is rotatably attached to the central portion of the link 34 by a pin, and the other end thereof is rotatably fixed to the end of a moving portion of the solenoid 36 by a pin. The solenoid 36 is fixed to a fixed portion 1c on the deck base 1.

When the moving portion of the solenoid 36 moves in the direction of arrow A in FIG. 1, the corrective optical glass 32 is moved toward the +Y side and inserted between the objective 5 and disk 80 as indicated by the solid line in FIGS. 1 and 2. Since, in this case, the glass 32 is positioned between the objective 5 and disk 80, the light from the objective 5 is incident upon the disk 80 through the glass 32.

On the contrary, when the moving portion of the solenoid 36 moves in the direction of arrow A', the corrective optical glass 32 is moved toward the −Y side and removed from between the objective 5 and disk 80, as indicated by the phantom line in FIGS. 1 and 2, and in this case, the light from the objective 5 is directly incident upon the disk 80.

Referring to FIGS. 5A and 5B, the configurations of two disks whose cover glasses differ in thickness, and the operations of apparatuses for these disks will now be described. Hereinafter reference numeral 80A or 80B denotes a specified one of the disks, and numeral 80 indicates a disk including both the disks.

The disk 80A is, as shown in FIG. 5A, a single-faced disk having a single information recording face 81 on/from which information is recorded/reproduced, and a cover glass 82 with a thickness of $t_1$ formed on the face 81. The thickness $t_1$ is 1.2 mm which is twice as great as that of the cover glass of the disk 80B which will be described later. The disk 80A has a uniform thickness. A metallic hub 84 having a hole into which a shaft 65 of the spindle motor 60 is inserted, is provided at the center of disk 80.

The disk 80B is, as shown in FIG. 5B, a double-faced disk having two information recording faces 81 on/from which information is recorded/reproduced, and two cover glasses 82 with a thickness of $t_2$ formed on respective faces 81. The thickness $t_2$ is 0.6 mm which is half that of the cover glass 82 of the disk 80A. That central portion of the disk 80B which contacts a turntable 66 of the spindle motor 60 is thick, and the thickness of the cover glass 82 at the thick portion is $t_1$ which is equal to that of the foregoing disk 80A. The hub 84 is provided on either side of the thick central portion of the disk 80B.

The mounting portions of the spindle motors 60 on which the disks 80A and 80B are mounted have the same constitution. The disks can thus be mounted on the same spindle motor.

As illustrated in FIGS. 5A and 5B, the spindle motor 60 on which the disk 80 is placed includes a base 61 fixed onto the deck base 1, and a yoke 62 wound with a coil 63 is attached to the base 61. The shaft 65 is rotatably mounted on the base 61 through a bearing 64, and the cylindrical turntable 66 is fixed to the shaft 65. A recess is formed in the upper surface of the turntable 66, and a chucking magnet 67 for attracting the hub 84 of the disk 80 by magnetic force. A magnet 68 is provided on the inner surface of the turntable 66 to generate a rotating driving force of the turntable 66 in association with the coil 63.

As shown in FIGS. 5A and 5B, the disk 80 is placed on the turntable 66 with its recording/reproduction face down and, in this case, it is automatically positioned by fitting the shaft 65 into the hole of the hub 84. The disk 80 is fixed on the turntable 66 since the chucking magnet 67 magnetically attracts the hub 84.

When recording or reproduction is performed for the disk 80A with the thick cover glass 82, as shown in FIG. 5A, the corrective optical glass 32 is removed from the optical path of light from the objective 5. The optical system including the objective 5 is so designed that the spherical aberration is minimized when the thickness of cover glass 82 is $t_1$. Consequently, the light from the objective 5 directly enters the disk 80A, and a light spot 88 is formed on the information recording face 81 with the minimum aberration.

When recording or reproduction is performed for the disk 80B with the thin cover glass 82, as shown in FIG. 5B, the glass 32 is arranged on the optical path of light from the objective 5. The glass 32 is formed of the same material as the cover glass 82, for example, polycarbonate, and has the same refractive index as that of the cover glass 82. The thickness of the glass 32 is $t_3$ which satisfies the following equation:

$$t_2 + t_3 = t_1 \qquad (1)$$

The optical system including the objective 5 is so designed that the spherical aberration is minimized with respect to the disk 80A the cover glass 82 of which has thickness $t_1$, whereas thickness $t_3$ of the corrective optical glass 32 and thickness $t_2$ of the cover glass 82 satisfy the above equation (1); thus, the disk 80B in conjunction with the glass 32 is equivalent to the disk 80A the cover glass 82 of which has thickness $t_1$. Consequently, the light from the objective 5 passes through the corrective optical glass 32 and enters the disk 80B, with the result that the light spot 88 can be formed on the information recording face 81 the cover glass 82 of which has thickness $t_2$, with the minimum spherical aberration.

As described above, when the disk 80B having the thin cover glass 82 is used, the corrective optical glass 32 having the thickness corresponding to the reduced thickness of the cover glass 82 is interposed between the objective 5 and disk 80B, thereby correcting the spherical aberration to a minimum.

The refractive index of the corrective optical glass 32 can be caused to differ from that of the cover glass 82 of the disk 80. The thickness $t_3$ of the glass 32 is then determined according to the material which minimizes the spherical aberration of the light spot 88.

In the optical system of the first embodiment, the light from the objective 5 is focused on the same level (in the Z direction), regardless of whether the corrective optical glass 32 is present or absent.

In the disk 80A, the thickness $t_1$ of the cover glass 82 is uniform, including the thickness of the central portion contacting the turntable 66. In the disk 80B, the thickness $t_2$ of that portion of the cover glass 82 in which information is actually recorded or reproduced, is thinner than that of the disk 80A, but the thickness,of the cover glass 82 of the central portion which contacts the turntable 66, is equal to thickness $t_1$. Therefore, as is apparent from FIG. 5, the level of the information recording face 81 (in the Z direction) is fixed, regardless of whether the disk 80A or disk 80B is loaded.

Since the level of the information recording face 81 is fixed irrespective of the type of disk, the position of the objective 5 in the Z direction need not be varied with the type of disk and, in other words, the reference position of the objective 5 in focus control is fixed irrespective of the type of disk, with the result that the stroke of the objective 5 moving in the Z direction can be minimized, and the mechanism for supporting the objective 5 in the Z direction for the focus control can be miniaturized. Thus, the movable section can be lightened and its driving sensitivity can be heightened. Since, furthermore, the level of the spindle motor 60 is fixed regardless of the type of disk, the motor 60 need not be moved in order to adjust the level of the information recording face in accordance with the type of disk.

In the first embodiment, a step is formed on the cover glass of the disk to adjust the level of the information recording face. However, the level of the spindle motor may be varied to do so.

(Second Embodiment)

Figure 6:
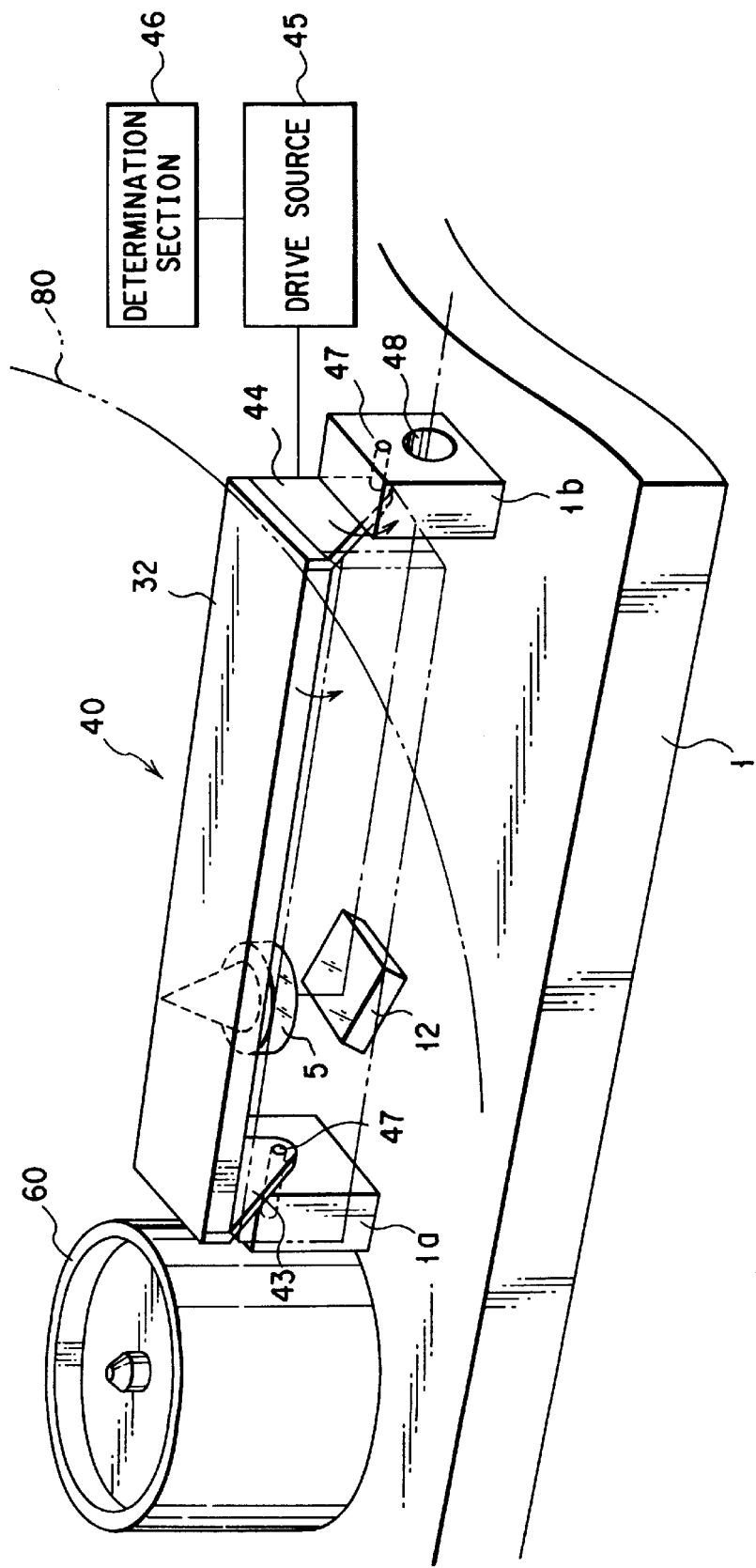
FIG. 6 is a perspective view of an aberration correcting mechanism of an information recording/reproduction apparatus according to a second embodiment of the present invention.

The second embodiment of the present invention will be described with reference to FIG. 6. In FIG. 6, the same elements as described in the first embodiment are denoted by the same reference numerals. In the second embodiment, another aberration correcting mechanism 40 is used in place of the mechanism 30.

The mechanism 40 includes a corrective optical glass 32 for correcting a spherical aberration and a supporting mechanism for movably supporting the glass 32. Plates 43 and 44 are fixed onto both ends of the glass 32 and attached to mounting sections 1a and 1b such that they can be rotated around a shaft 47. The mounting section 1b has a hole 48 through which light passes between a fixed optical system and a movable section.

The information recording/reproduction apparatus having the aberration correcting mechanism 40, includes a drive source 45 for moving the corrective optical glass 32, such as a linear solenoid for swinging the plates 43 and 44, and a rotary solenoid for rotating the shaft 47. The corrective optical glass 32 is moved to the optical path, as indicated by the solid line, or removed therefrom, as shown by the phantom line.

The apparatus further includes a determination section 46 for determining the type of a loaded disk 80. The corrective optical glass 32 is usually located away from the disk 80, as indicated by the phantom line, in order to avoid contacting the disk 80 and does not move to the optical path until it is confirmed that the loaded disk 80 corresponds to a thin disk 80B with a cover glass 82.

When the thin disk 80B is loaded, its surface is located farther away from the objective 5 than that of a thick disk 80A with a cover glass 82. The distance between the objective 5 and disk 80B is thus enlarged, and the glass 32 is inserted in this large distance.

On the contrary, when the thick disk 80A is loaded, the distance between the objective 5 and disk 80A is narrow, but the glass 32 is provided away from the disk 80A and thus unlikely to collide with the disk 80A.

According to the second embodiment, the dimension of the entire apparatus in its height direction (Z direction) can be decreased further.

(Third Embodiment)

Figure 7A:
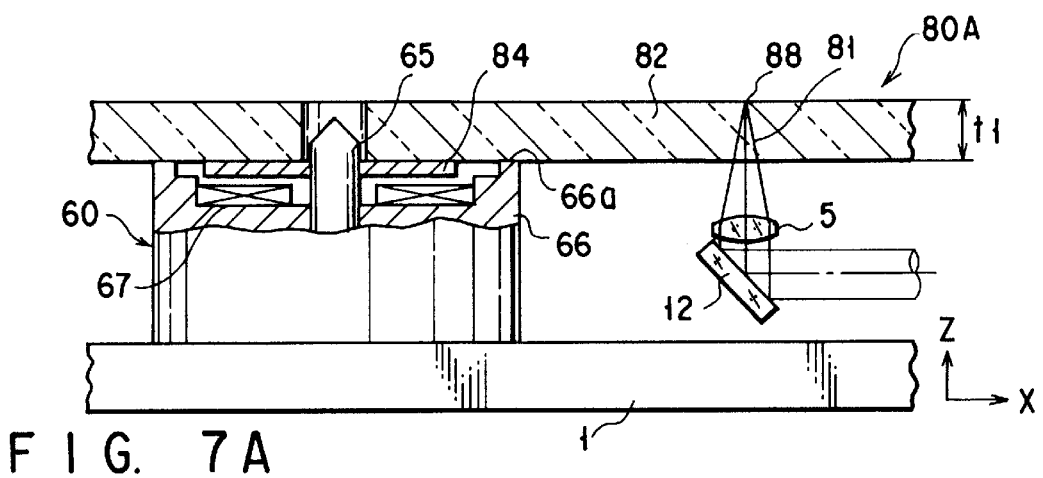
FIGS. 7A and 7B are partly cross-sectional views of information recording/reproduction apparatuses loaded with their respective disks of two different types, for explaining the constitution of a turntable of an information recording/reproduction apparatus according to a third embodiment of the present invention.
Figure 7B:
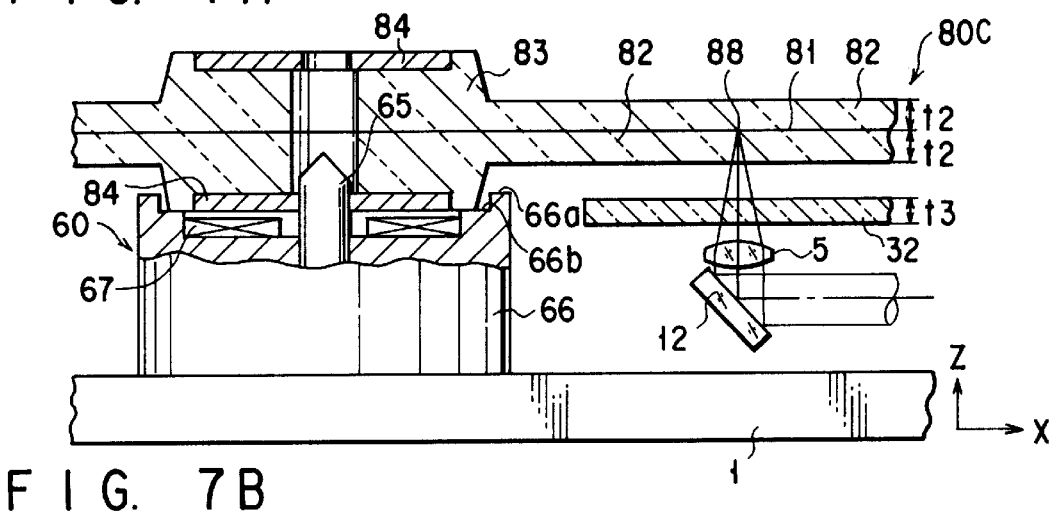

The third embodiment of the present invention will now be described with reference to FIGS. 7A and 7B. In FIGS. 7A and 7B, the same elements as described in the first embodiment are indicated by the same reference numerals. The optical system of the third embodiment is identical with that of the first embodiment, and adjusts its focal point, regardless of whether the corrective optical glass is present or absent.

According to the third embodiment, the turntable 66 is contrived in order to set the information recording face 81 of another double-faced disk 80C at the same level as that of the foregoing single-faced and double-faced disks 80A and 80B.

As illustrated in FIGS. 7A and 7B, the turntable 66 includes a recess in its upper surface, and the recess has steps on its inner periphery. The turntable also includes an outer receiving face 66a for receiving the disk 80A and an inner receiving face 66b for receiving the disk 80C.

The disk 80A is held with its cover glass 82 in contact with the outer receiving face 66a of the turntable 66, as shown in FIG. 7A. Therefore, the information recording face 81 is located above the receiving face 66a by the thickness $t_1$ of the cover glass 82.

In contrast, since, as shown in FIG. 7B, the diameter of a thick central portion 83 of the disk 80C is a size smaller than the inside diameter of the receiving face 66a, the disk 80C is supported with the central portion 83 in contact with the inner receiving face 66b. The thickness of the cover glass 82 in the central portion 83 of the disk 80C is equal to the sum of thickness $t_1$ of the cover glass 82 of the disk 80A and a difference between the receiving faces 66a and 66b. As a result, the level of the information recording face 81 of the disk 80C is the same as that of the information recording face 81 of the disk 80A.

As is apparent from the above, the level of the information recording face 81 is fixed irrespective of the type of disk 80, as is the reference position of the objective 5. The supporting drive mechanism of the objective 5 can be miniaturized. An information recording/reproduction system whose movable section is improved in driving sensitivity, can thus be achieved.

The third embodiment can be applied to a variety of disks in combination with the first embodiment. Specifically, since the turntable 66 of the third embodiment is applicable to the disk 80B and the diameter of the central portion of the disk 80B is the same as that of the turntable 66, the disk 80B is received by the outer receiving face 66a of the turntable 66, and the level of the information recording face 81 is equal to that of each of the disks 80A and 80C. Consequently, the levels of the information recording faces of three different disks 80A, 80B and 80C are the same, and they are loaded on the turntable 66.

According to the third embodiment, the turntable 66 has two receiving faces 66a and 66b. However, it may have more receiving faces so as to be applied to a larger variety of disks.

(Fourth Embodiment)

Figure 8:
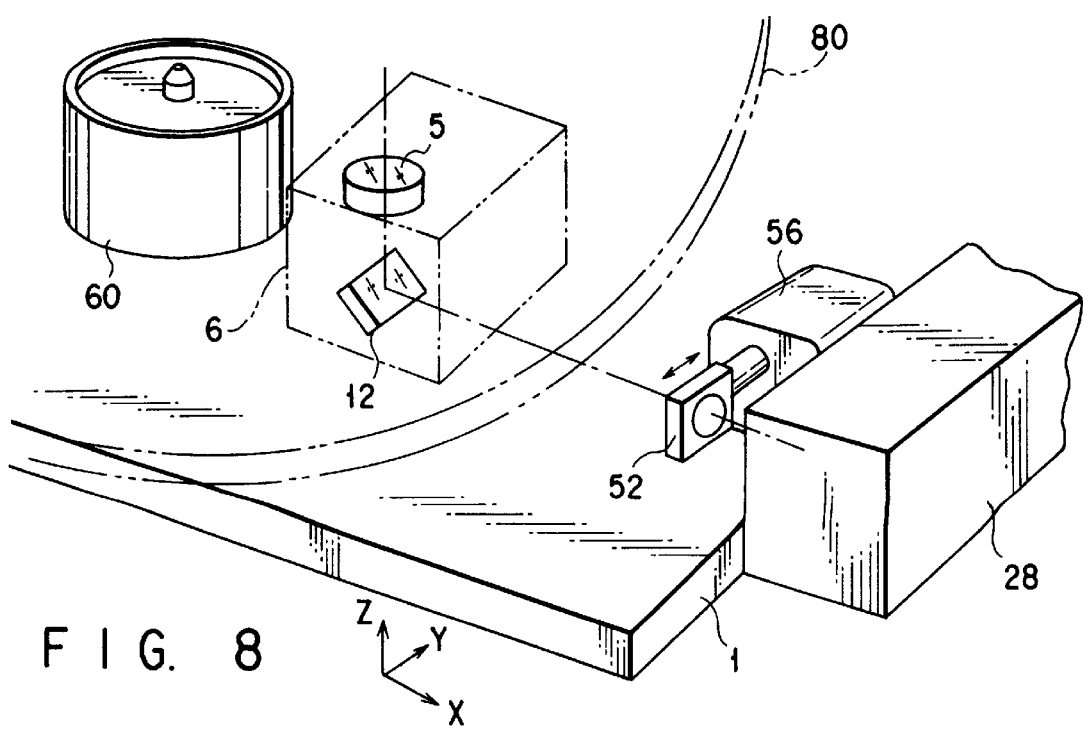
FIG. 8 is a perspective view of an aberration correcting mechanism of an information recording/reproduction apparatus according to a fourth embodiment of the present invention.

The fourth embodiment of the present invention will be described with reference to FIGS. 8, 9A and 9B. In these figures, the same elements as described in the first embodiment are denoted by the same reference numerals. In the fourth embodiment, another aberration correcting mechanism is used in place of the above-described mechanisms 30 and 40.

The aberration correcting mechanism of the fourth embodiment includes a corrective optical element 52 for correcting a spherical aberration caused by difference in thickness among cover glasses of disks 80 and a linear solenoid 56 serving as a driving mechanism and fixed to a deck base 1 so as to support the optical element 52 movably in the directions of arrows. The corrective optical element 52 is moved to or removed from the optical path formed between a fixed optical system 28 and an objective 5. The corrective optical element 52, which is constituted of a hologram element or an optical element whose both sides are powerless and aspherical, corrects only the spherical aberration in the light emitted from a light source.

Figure 9A:
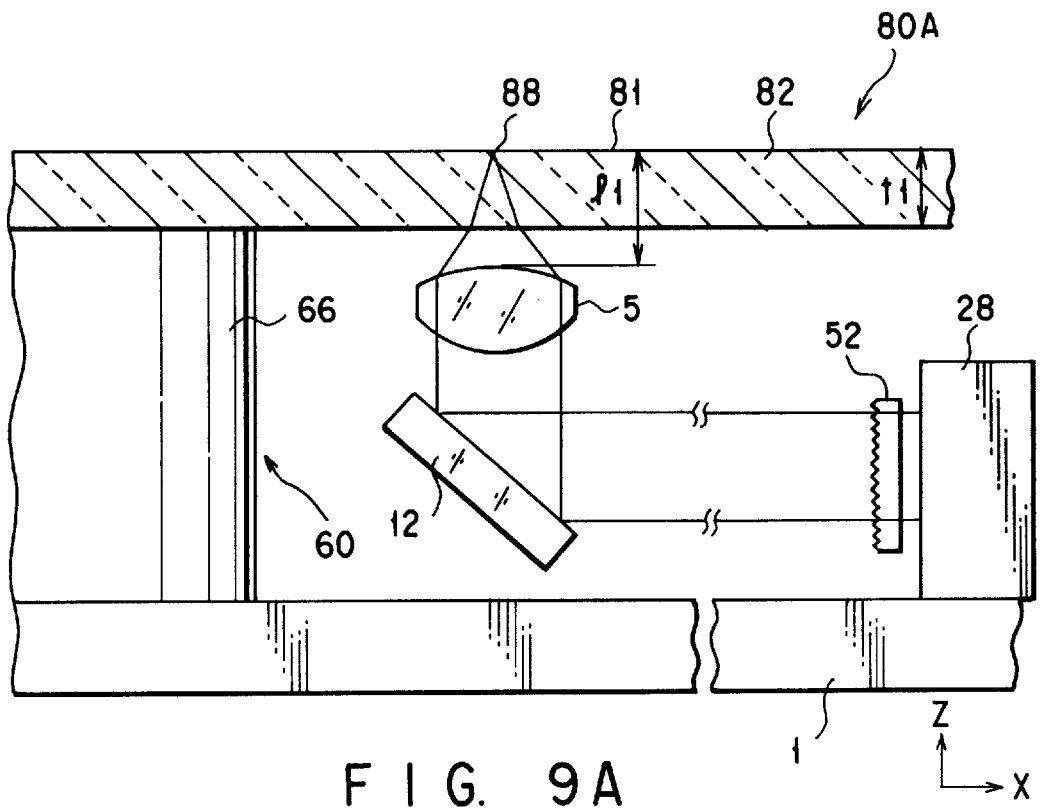
FIGS. 9A and 9B are partly cross-sectional views of information recording/reproduction apparatuses loaded with their respective disks of two different types which are applicable to the apparatus shown in FIG. 8.
Figure 9B:
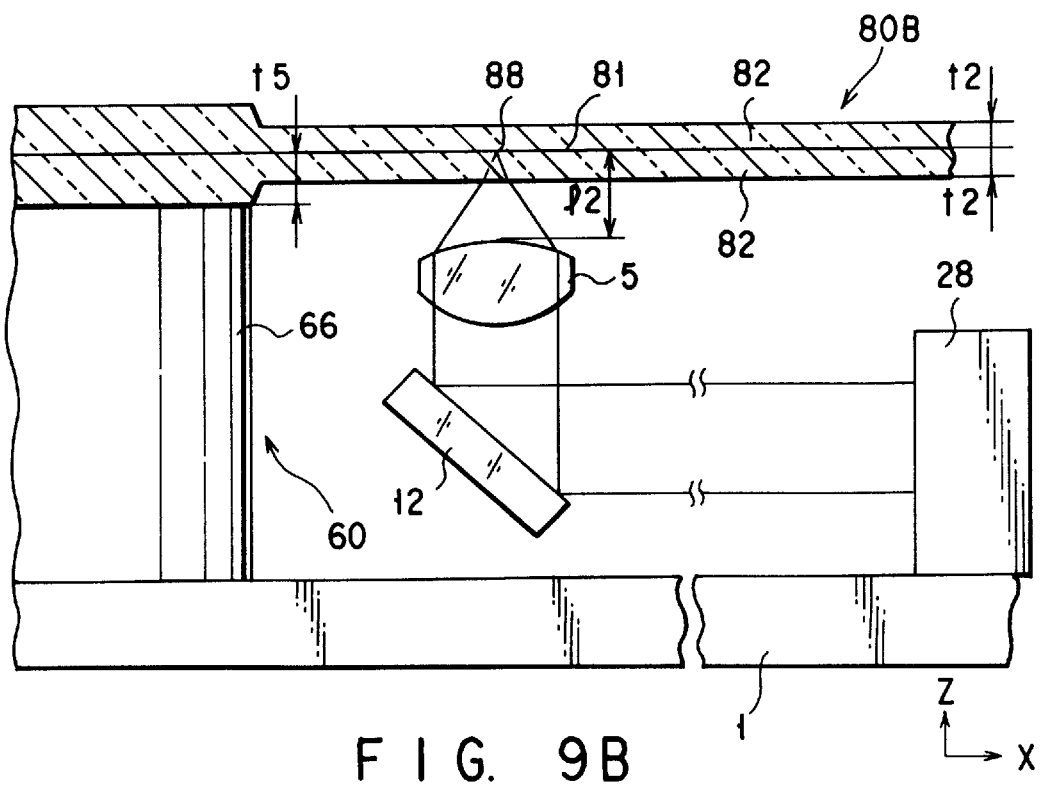

In a disk 80B with a thin cover glass 82 (the thickness of which is $t_2$), as shown in FIG. 9B, the corrective optical element 52 is removed from the optical path. Since the optical system is so designed that the spherical aberration is minimized for the disk 80B the cover glass 82 of which has a thickness $t_2$, a light spot 88 is formed on the information recording face 81 with the minimum spherical aberration.

In a disk 80A with a thick cover glass 82 (the thickness of which is $t_1$), as shown in FIG. 9A, the corrective optical element is inserted in the optical path. The element 52 corrects the spherical aberration caused by difference in thickness among cover glasses and, in this case, too, a light spot 88 is formed on the information recording face 81 with the minimum spherical aberration.

Since the refractive index of cover glass 82 of disk 80 is about 1.5, the distance from the objective 5 to the optical spot 88 in the case of disk 80B (FIG. 9B) is smaller than that in the case of disk 80A (FIG. 9A). That is, $l_2$ is smaller than $l_1$.

As shown in FIG. 9B, the disk 80B is formed thicker in its central portion 83 which corresponds to the turntable 66 of the spindle motor 60, and the thickness $t_5$ of the thick central portion is set such that the level of the information recording face 81 is equal to the focal plane of the optical system. In other words, the level of the information recording face 81 in the disk 80B with thin cover glass 82 is lower than that in the disk 80A with thick cover glass 82 since the focal point in the case of the disk 80B is closer to the objective 5.

The information recording face 81 is located on the focal point irrespective of the type of disk 80. Even though the disk 80 varies in its type, the objective 50 does not vary in its reference position. Consequently, the driving mechanism of the objective 5 for focus control can be miniaturized and decreased in moving stroke in the Z direction, and the movable section can be lightened and miniaturized, thereby enhancing the driving sensitivity of the movable section.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

For example, three or more disks which differ in thickness of cover glass can be applied to the present invention, and in this case a corrective optical element is arranged on the optical path in accordance with the type of disk. In addition, any optical recording medium such as a phase change disk, a photomagnetic disk and a compact disk, can be used for the disks. Still further, any element can be used for the corrective optical element if it corrects a spherical aberration of a light spot.

What is claimed is:

1. An information recording/reproduction system for recording/reproducing information, said system comprising:

optical recording mediums of different types;

an information recording/reproduction apparatus for recording/reproducing information on/from said optical recording mediums, said apparatus including a table for receiving said different types of optical recording mediums; and optimization means for optimizing a level of an information recording face of each optical recording medium in accordance with a type of the optical recording medium mounted on said information recording/reproduction apparatus;

wherein each of said different types of optical recording mediums includes at least one information recording face, at least one protective layer covering said at least one information recording face and at least one contacting portion for contacting the table, said at least one protective layer and said at least one contacting portion being integrated as a single unitary device, and wherein a height difference with respect to the table between said at least one protective layer and said at least one contacting portion varying in accordance with the type of said optical recording medium such that the information recording face of each optical recording medium is readable by said information recording/ reproduction apparatus;

wherein each of said at least one protective layer varies in thickness in accordance with the type of optical recording medium;

wherein said information recording/reproduction apparatus includes a light source for emitting light by which the information is recorded/reproduced, an objective for focusing the light emitted from said light source upon the information recording face of each different type of optical recording medium, and a corrective optical element for correcting a spherical aberration caused by a difference in thickness among the protective layers;

wherein said optimization means includes level adjustment means for adjusting a level of said different types of optical recording mediums such that the information recording faces of said different types of optical recording mediums are set at a fixed distance from the objective regardless of the type of said optical recording medium;

wherein said at least one contacting portion varies in size in addition to thickness in accordance with the type of said optical recording medium; and wherein said level adjustment means includes said table, which has a plurality of receiving faces for receiving said at least one contacting portion of said different types of optical recording mediums, said plurality of receiving faces having varying positions in accordance with thicknesses of said at least one contacting portion such that the focal point of said different types of optical recording mediums remains constant with respect to said light source.

2. An information recording/reproduction system for recording/reproducing information, said system comprising:

optical recording mediums of different types;

an information recording/reproduction apparatus for recording/reproducing information on/from said optical recording mediums, said apparatus including a table for receiving said different types of optical recording mediums; and optimization means for optimizing a level of an information recording face of each optical recording medium in accordance with a type of the optical recording medium mounted on said information recording/reproduction apparatus;

wherein each of said different types of optical recording mediums includes at least one information recording face, at least one protective layer covering said at least one information recording face and at least one contacting portion for contacting the table, said at least one protective layer and said at least one contacting portion being integrated as a single unitary device, and wherein a height difference with respect to the table between said at least one protective layer and said at least one contacting portion varying in accordance with the type of said optical recording medium such that the information recording face of each optical recording medium is readable by said information recording/reproduction apparatus;

wherein each of said at least one protective layer varies in thickness in accordance with the type of said optical recording medium;

wherein said information recording/reproduction apparatus includes a light source for emitting light by which the information is recorded/reproduced, an objective for focusing the light emitted from said light source upon the information recording face of each different type of optical recording medium, a corrective optical element for correcting a spherical aberration caused by different thickness among the protective layers, and insertion/removal means for properly inserting/removing said corrective optical element in/from an optical path extending between said light source and said objective;

wherein said optimization means includes level adjustment means for adjusting a level of said different types of optical recording mediums such that the information recording faces of said optical recording mediums are set at different distances from the objective, according to whether said corrective optical element is present or absent in said optical path;

wherein said at least one contacting portion varies in size in addition to thickness in accordance with the type of said optical recording medium; and wherein said level adjustment means includes said table, which has a plurality of receiving faces for receiving said at least one contacting portion of said optical recording mediums, said plurality of receiving faces having varying positions in accordance with thicknesses of said at least one contacting portion such that the focal point of said different types of optical recording mediums remains constant with respect to said light source.

* * * * *